United States Patent
Gakumura et al.

(10) Patent No.: US 7,782,205 B1
(45) Date of Patent: Aug. 24, 2010

(54) ELECTRONIC DEVICE WITH AN ANTITHEFT FUNCTION AND METHOD FOR PREVENTING THEFT OF ELECTRONIC DEVICES

(76) Inventors: Hiroki Gakumura, 403 N. Forrest St., Forrest City, AR (US) 72335; Hideki Baba, 2210 Campbell Dr., Forrest City, AR (US) 72335; Akira Tsurusaki, 1710 Kellen Cove, Forrest City, AR (US) 72335

( * ) Notice: Subject to any disclaimer, the term of this patent is extended or adjusted under 35 U.S.C. 154(b) by 343 days.

(21) Appl. No.: 11/904,145

(22) Filed: Sep. 25, 2007

(51) Int. Cl.
*G08B 13/14* (2006.01)

(52) U.S. Cl. .................................. 340/572.1; 235/382

(58) Field of Classification Search ............. 340/572.1, 340/5.61, 545.2, 825.72; 235/382, 492; 705/44
See application file for complete search history.

(56) References Cited

U.S. PATENT DOCUMENTS

| | | | |
|---|---|---|---|
| 5,936,523 A * | 8/1999 | West | 340/545.6 |
| 6,883,710 B2 * | 4/2005 | Chung | 235/385 |
| 7,380,711 B2 * | 6/2008 | Simon et al. | 235/383 |
| 2007/0018787 A1 * | 1/2007 | Martinez de Velasco Cortina et al. | 340/5.61 |
| 2007/0131005 A1 * | 6/2007 | Clare | 340/825.72 |
| 2008/0183307 A1 * | 7/2008 | Clayton et al. | 700/8 |
| 2009/0125401 A1 * | 5/2009 | Beenau et al. | 705/44 |

FOREIGN PATENT DOCUMENTS

JP     2007-024843    2/2007

* cited by examiner

*Primary Examiner*—John A Tweel, Jr.
(74) *Attorney, Agent, or Firm*—Masuvalley & Partners

(57) ABSTRACT

The present invention relates to an electronic device with an antitheft function consisting of a wireless tag containing information enabling the electronic device to operate, and a control portion accessible to the wireless tag, where the control portion releases a lock of the electronic device when the electronic device is determined to be operable according to the information stored in the wireless tag. Also, the present invention includes a method for preventing theft of an electronic device that includes the steps of writing information enabling the electronic device to operate on a memory of a wireless tag by a wireless tag writer at the time of purchase of the electronic device, and determining if the electronic device is operable according to the information written on the wireless tag.

16 Claims, 14 Drawing Sheets

ELECTRONIC DEVICE WITH AN ANTITHEFT FUNCTION AND METHOD FOR PREVENTING THEFT OF ELECTRONIC DEVICES

TECHNICAL FIELD

The objective of the present invention is to prevent theft of electronic devices from stores and so on. That is, the present invention is to write a lock release code on to a wireless tag embedded in an electronic device at the time of purchase of the electronic device. And, the electronic device does not operate when the lock release code is not written.

BACKGROUND OF INVENTION

Conventionally, a typical method for preventing theft of electronic devices is to, for example, embed a sensor called a sensor tag on an item of merchandise or to attach it to a carton case, and install a sensor in the doorway of a store to detect and sound a buzzer when the merchandise is removed from the store without releasing the function of the sensor at a cash register. However, the effect raises a question because the sensor tag loses its effect once it is removed, and further the electronic devices are still stolen even when the buzzer goes off.

Also, the Japanese published unexamined application No. 2007-24843 discloses a digital camera provided with a voltage current detection portion and a wireless tag. The digital camera is an invention that utilizes the wireless tag, and is specifically described as follows. The voltage current detection portion detects the current value and the voltage value applied to load on each part of the digital camera, and outputs this detection value to the wireless tag. The wireless tag determines as to whether the detection value data is normal or abnormal, and the judgment information is written in a memory when the detection value is abnormal. And, when the digital camera receives a control signal from an external device, reads the abnormal detection value and transmits to the external device through an antenna of the wireless tag.

Also, the following is known as a conventional technique. First, find a Radio Frequency Identification Reader (RFID) embedded in a item of merchandise using the RFID at the time of the sale of the merchandise. When the RFID is found, read the information and transmit to a manufacturer. The manufacturer processes the information and transmits it back to the merchandise. And, the merchandise now operates.

However, any of these inventions described above are incomplete for preventing theft of electronic devices from stores. Under this circumstance, an invention which disables merchandise from use when the merchandise is stolen, demotivates thieves, and prevents this type of crime, has been desired.

BRIEF SUMMARY OF THE INVENTION

The present invention is an electronic device consisting of a wireless tag storing information that enables operation of the electronic device, and a control portion that is accessible to the wireless tag, wherein the information enabling the operation of the electronic device is written on the wireless tag by a wireless tag writer, and the control portion releases a lock of the electronic device when the electronic device is determined to be operable according to the information stored in the wireless tag.

By configuring as described above, the electronic device does not operate when the electronic device is determined to be inoperable. Therefore, by providing the electronic device with the information only to those who legitimately purchased the electronic device, those who did not legitimately purchase the electronic device (for example, a thief) can not use the electronic device because he or she does not have the information. Also, there is no worth in reselling the electronic device because it can not be used. In this way, thieves are demotivated, and the damage from theft is decreased.

Also, by configuring as described above, there is no need for stores to install special devices or jigs at cash registers or store exits to prevent theft. Thereby a decrease in the cost of theft prevention, and also a decrease in the cost from the stand point of store space that can now be used for other purposes or store spaces can now be smaller. Also, there is no need for instructing store clerks how to operate antitheft devices. In the case of the present invention, there is no need to instruct store clerks on antitheft because the information is stored in the electronic device during a manufacturing process.

The control portion may request the input of a lock release code when the electronic device is determined to be inoperable according to the information stored in the wireless tag.

By configuring as described above, a user can attempt to re-input without having to bring it to a store when the information was not input accurately on the electric device.

The electronic device further has a decoder to produce image data and audio data by decoding a television signal received from a tuner, the control portion may stop the output from the decoder when the electronic device is determined to be inoperable according to the input of the lock release code. The electronic device may be connected to an external device through a cable, electronic device receives a video signal and an audio signal from said external device, and said control portion stops the reception of the video signal or the audio signal from the external device when the result of comparison at said comparing portion is not confirmed.

The electronic device further has a reset circuit to set to an initial state, and the electronic device may still display an image when it is reset to the initial state case the electronic device is determined to be inoperable according to the information stored in the wireless tag.

By configuring as described above, once a user inputs an appropriate code, it will not cause trouble to the user even when it is reset to an initial state later. Also, the objective of theft prevention can be met.

Also, the present invention is an electronic device comprising a wireless tag containing information related to a serial number of the electronic device, and a control portion accessible to the wireless tag, wherein a lock release code according to the information related to the serial number stored in the wireless tag is further written on the wireless tag by a wireless tag writer at a time of purchase of the electronic device, and said control portion releases a lock of the electronic device when the electronic device is determined to be operable according to the lock release code written on the wireless tag.

By configuring as described above, the electronic device does not operate when the electronic device is determined to be inoperable. Therefore, by providing the electronic device with the code only to those who legitimately purchased the electronic device, those who did not legitimately purchase the electronic device (for example, a thief) can not use the electronic device because he or she does not have the code. Also, there is no worth in reselling the electronic device because it can not be used. In this way, thieves are demotivated, and the damage from theft is decreased.

Also, by configuring as described above, there is no need for stores to install special devices or jigs at cash registers or store exits to prevent theft. Thereby a decrease in the cost of theft prevention, and also a decrease in the cost from the stand point of store space that can now be used for other purposes or store spaces can now be smaller. Also, there is no need for instructing store clerks how to operate antitheft devices. In the case of the present invention, there is no need to instruct store clerks on antitheft because the information is stored in the electronic device during a manufacturing process.

Writing the lock release code on the wireless tag may further be performed by the wireless tag reader by reading the information related to the serial number of the electronic device stored in the wireless tag, and writing a lock release code corresponding to the information related to the serial number of the electronic device on the wireless tag with the wireless tag writer at the time of purchase of the electronic device.

When a thief obtains the lock release code of an electronic device, other electronic devices can be used if a plurality of electronic devices share the same lock release code and those devices were stolen. Thieves have a tendency of repeating a theft. However, by configuring electronic devices as described above, theft of other electronic devices can be prevented even if a certain lock release code has been stolen because each electronic device is provided with a different lock release code.

The control portion may request to input a lock release code when the electronic device is determined to be inoperable according to the information stored in the wireless tag.

By configuring as described above, a user can attempt to re-input without having to bring it to a store when the information was not input accurately on the electric device.

The electronic device further has a decoder to produce image data and audio data by decoding a television signal received from a tuner, the control portion may stop the output from the decoder when the electronic device is determined to be inoperable according to the input of the lock release code. The electronic device is connected to an external device through a cable, said electronic device receives a video signal and an audio signal from said external device, and said control portion stops the reception of the video signal or the audio signal from the external device when the result of comparison at said comparing portion is not confirmed.

The electronic device further has a reset circuit to set to an initial state, and the electronic device may still display an image when it is reset to the initial state in case the electronic device is determined to be operable according to the information stored in the wireless tag.

By configuring as described above, once an electronic device is determined to be operable, it will not cause trouble to the user even when it is reset to an initial state later. Also, the objective of theft prevention can be met.

Also, the present invention is a method for preventing theft of electronic devices, the method consisting of the steps of writing information that enables operation of the electronic device on a memory of a wireless tag by a wireless tag writer at the time of purchase of the electronic device, and determining if the electronic device is operable according to the information written on the wireless tag.

By configuring as described above, the electronic device does not operate when the electronic device is determined to be inoperable. Therefore, by providing the electronic device with the information only to those who legitimately purchased the electronic device, those who did not legitimately purchase the electronic device (for example, a thief) can not use the electronic device because he or she does not have the information. Also, there is no worth in reselling the electronic device because it can not be used. In this way, thieves are demotivated, and the damage from theft is decreased.

Also, by configuring as described above, there is no need for stores to install special devices or jigs at cash registers or store exits to prevent theft. Thereby a decrease in the cost of theft prevention, and also a decrease in the cost from the stand point of store space that can now be used for other purposes or store spaces can now be smaller. Also, there is no need for instructing store clerks how to operate antitheft devices. In the case of the present invention, there is no need to instruct store clerks on antitheft because the code is stored in the electronic device during a manufacturing process.

The method for preventing theft may further have a step for requesting to input a lock release code when the electronic device is determined to be inoperable according to the information stored in the wireless tag.

By configuring as described above, a user can attempt to re-input without having to bring it to a store when the information was not input accurately on the electric device.

The method for preventing theft of electronic devices may further consist of steps for writing the information related to the serial number of the electronic device on the wireless tag in advance at the time of shipping of the product, reading the information related to the serial number of the electronic device stored in the wireless tag by the wireless tag reader at the time of the purchase of the electronic device, and writing the lock release code corresponding to the information related to the serial number of the electronic device on the wireless tag by the wireless tag writer.

When a thief obtains the lock release code of the electronic device, other electronic devices can be used if a plurality of electronic devices share the same lock release code and those devices were stolen. Thieves have a tendency of repeating a theft. However, by configuring electronic devices as described above, theft of other electronic devices can be prevented even if a certain lock release code has been stolen because each electronic device is provided with a different lock release code.

The method for preventing theft may further consist of steps for generating video data and audio data by decoding a television signal received from a tuner, and stopping the output of the video data and the audio data when the electronic device is determined to be inoperable according to the information written on the wireless tag.

The electronic device further has a function to set to an initial state, and the electronic device may still display an image of the television receiver when it is reset to the initial state in case the electronic device is determined to be operable according to the information written on the wireless tag.

By configuring as described above, once an electronic device is determined to be operable, it will not cause trouble to the user even when it is reset to an initial state later. Also, the objective of theft prevention can be met.

DETAILED DESCRIPTION OF INVENTION

Figure 1:
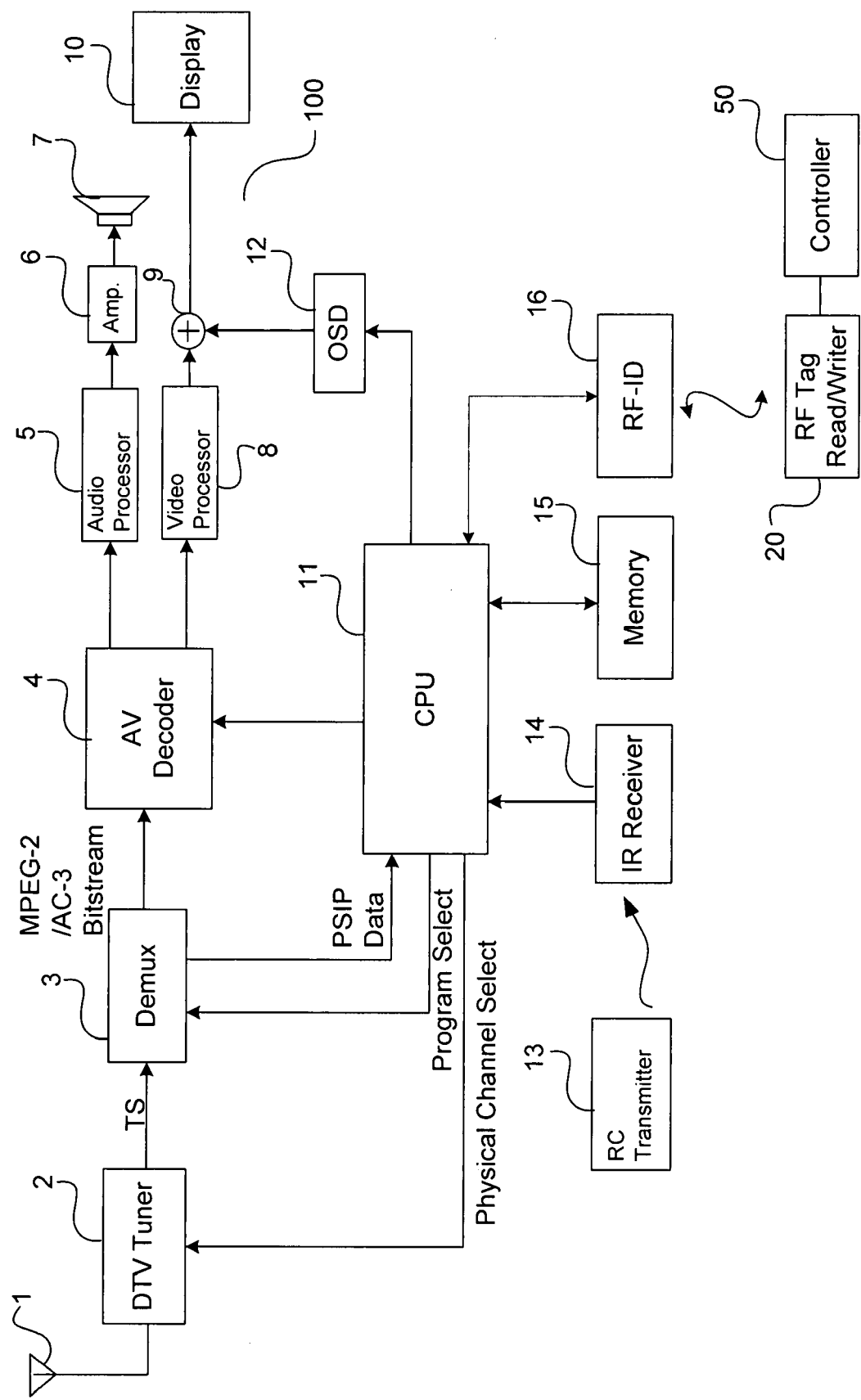
FIG. 1 is a block diagram of a television receiver according to the present invention.

FIG. 1 shows a block diagram of a television receiver 100 according to the present invention. In this embodiment, a U.S. digital television receiver which receives an ATSC signal is described as an embodiment.

A terrestrial antenna 1 receives digital terrestrial broadcasting wave, and supplies the received signal to a digital terrestrial tuner 2. The tuner selects a physical channel by a channel select signal from a CPU or a microprocessor 11. The digital terrestrial tuner 2 retrieves a specific frequency signal from a high frequency digital modulation signal 8VSB (8-level vestigial sideband modulation) including video/audio data by this channel select process. Also, the digital terrestrial tuner 2 is provided with a 8VSB demodulation circuit (not shown) and alike to demodulate the digital modulation signal of selected physical channels and outputs a transport stream TS.

A demultiplexer (DEMUX) 3 divides the transport stream TS received from the digital terrestrial tuner 2 into a video stream of MPEG-2 and an audio stream of AC-3, PSIP (Program and System Information Protocol) data upon receiving a program select signal from CPU 11 by dividing in a predetermined packet. The demultiplexer 3 supplies the video stream and the audio stream to an AV decoder 4, and PSIP data which includes program information, is supplied to the CPU 11 (AC-3 is a registered trademark of Dolby Laboratories Licensing Corporation).

The CPU 11 performs various controls of the television receiver, as well as processing of the PSIP data, and processing of remote control signals described later. A memory 15 is connected to the CPU 11, and the memory 15 stores various data including the program information and a release code described later.

A plurality of channels are multiplexed in the transport stream TS, and the process of selecting arbitrary channels from these can be made by retrieving the data such as which packet IP in the transport stream TS is used to multiplex.

An AV decoder 4 is provided with a MPEG video decoder for decoding a MPEG-2 bit stream, and an AC-3 decoder for decoding an audio stream (AC-3 bit stream). The video data generated by the decoder of AV decoder 4 is output to a video processor 8, and audio data is output to an audio processor 5.

The video processor 8 receives the video data from the AV decoder 4 and generates a video signal by performing a D/A (digital to analog) conversion. The audio processor 5 receives the audio data output from the AV decoder 4 and generates analog audio signals by performing a D/A conversion.

An OSD (On Screen Display) circuit 12 outputs video signals to an adder 9 based on the character information instructed to output from the CPU 11. The adder 9 incorporates the video signal based on the bitmap data into a reception video signal, and supplies this video signal to a display 10, such as a LCD.

The display 10 displays images according to the video signals supplied from the video processor 8. Also, the analog audio signal from the audio processor 5 is output from a speaker 7 after being amplified with an amplifier 6.

A remote control transmitter 13 is the transmitter to transmit various instructions to the digital television receiver. When a key (not shown) provided to this remote control transmitter 13 is operated, an IR (Infrared) signal (remote control signal) which is an instruction corresponding to the key, is transmitted from a light emitting portion (not shown). An IR receiver 14 receives the signal light, transfers the signal light into an electrical signal, and supplies the electrical signal to the CPU 11.

The television receiver 100 according to the present invention incorporates a wireless tag 16. And, a wireless tag reader 20 may be used to read the data from the wireless tag 16. Also, a wireless tag writer 20 may be used to write the data to the wireless tag 16. Further, a control device 50 is provided to control the wireless tag reader and wireless tag writer. The wireless tag 16 is electrically connected to the CPU 11. The connection may be made wired or wirelessly. The CPU 11 is capable of writing and reading a memory of the wireless tag 16.

The wireless tag 16 receives the RF signal from the wireless tag reader and the wireless tag writer 20, and generates power necessary for operation. Also, the wireless tag 16 writes the received data on the memory of the wireless tag, and reads data from the memory according to the received data. In this memory, an UID (Unique ID) allocated at the time of manufacture is stored as an identification information to identify the wireless tag 16. Specifically, a manufacturer code, or a product code, and a serial number are stored as the UID. Therefore, the wireless tag reader and the wireless tag writer 20 identify the television receiver with the wireless tag 16 attached by reading the UID from the wireless tag 16. By writing predetermined information on the memory of this wireless tag 16, the television receiver is determined as to whether it is sold legitimately or not.

Figure 2:
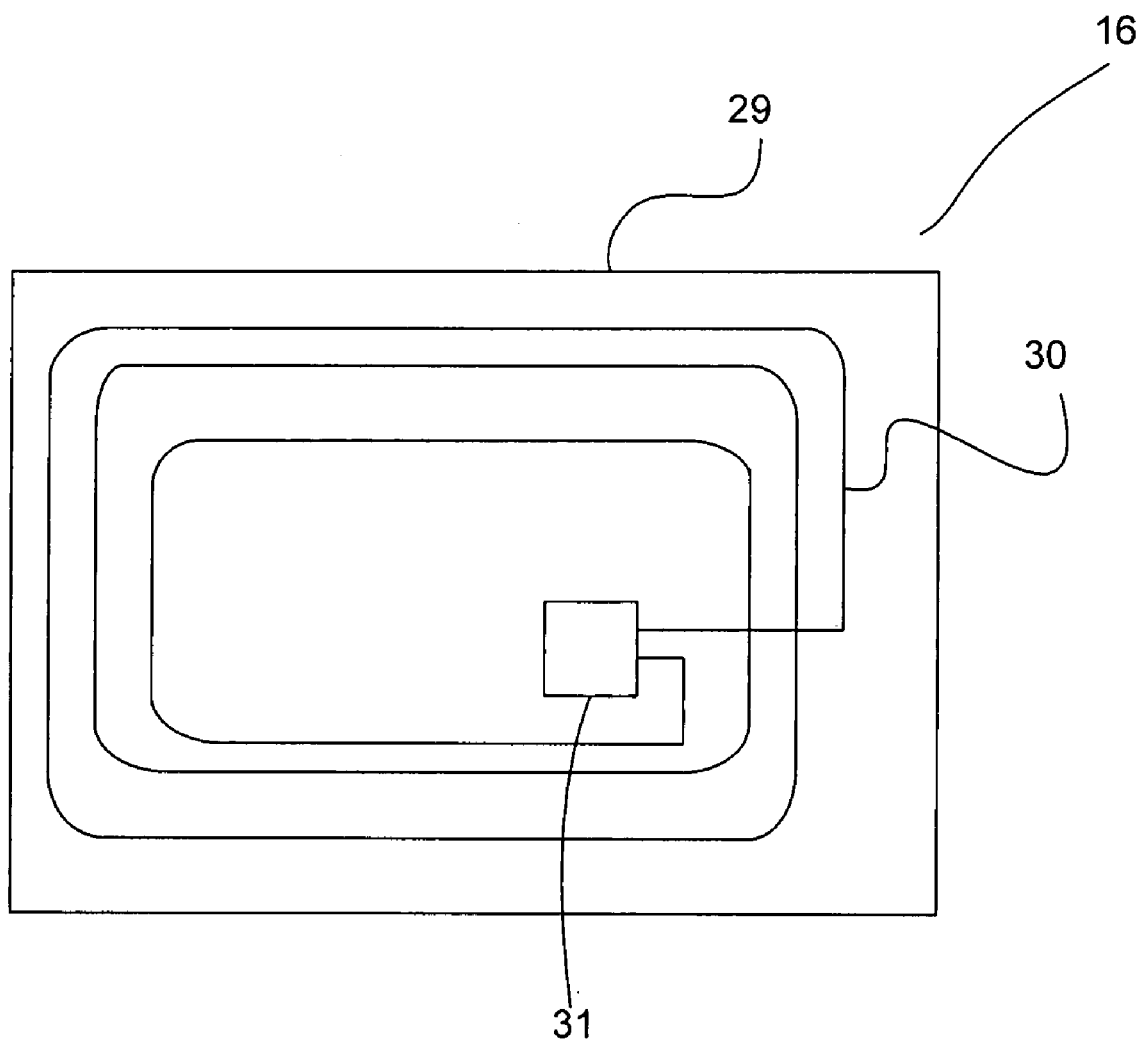
FIG. 2 shows a configuration of a wireless tag according to the present invention.

The FIG. 2 shows a configuration of a wireless tag according to the present invention. The wireless tag 16 may also be referred as an IC tag, an ID tag, a RF tag, an electronic tag, a transponder, and a data carrier. The wireless tag 16 consists of a substrate 29 in a thin rectangular form, an antenna coil 30 wired in a spiral along each side of the substrate 29, and a semiconductor chip 31 connected to the antenna coil 30 and arranged inside the antenna coil 30. For example, the substrate 29 is formed from a resin sheet in a thickness of 0.2 millimeters (mm), and the antenna coil 30 is formed on the resin sheet by printing or etching. The thickness of the substrate 29 is not limited specifically. The semiconductor chip 31 consists of a condenser to form a resonance circuit together with the antenna coil 30, a demodulation circuit to demodulate the receiving circuit, a process circuit to process the receiving data, and a semiconductor memory to store the UID or the receiving data. The semiconductor chip 31 is electrically configured to be connected to the CPU 11.

The wireless tag 16 may be a tag using a RF-ID (Radio Frequency Identification) technology capable of reading the data recorded in an electric circuit of a semiconductor memory or writing the data by receiving the RF signal. The wireless tag 16 may be a permanently usable tag without having a power supply that is from a development of a non-contact power carrier technology. A wireless tag reader may be used to read the data from the wireless tag 16. Also, a wireless tag writer may be used to write the data on the wireless tag 16. The response signal from the wireless tag 16 is output according to the response request from the wireless tag reader and writer 20. Specifically, the wireless tag 16 reads the data from the memory of the semiconductor chip 31 according to the received data from the wireless tag reader and writer 20, and generates the response signal by encoding the subcarrier wave generated from performing load modulation on the RF signal.

Against the wireless tag 16, the data can be written, or read by using an ASK modulated RF signal. The wireless tag reader and writer 20 transmits the ASK modulation signal to the wireless tag 16, and performs an operation to receive the response signal from the wireless tag 16. This reader and writer 20 is a so called VICC (Vicinity) type reading device. Specifically, the reader and writer 20 is favorable for noncontact communication when the distance to the wireless tag 16 is within a range of a few centimeters (cm) to tens of cm (for example, 70 cm). The reader and writer 20 are connected to the control device 50 through a serial bus cable. This reader and writer 20 are also referred to as a head. The control device 50 is also referred as a controller, and consists of a superordinate computer or PLC. In addition, the head and the controller may be configured from separate members, or may be integrated. In addition, the details of the paragraphs [0047] to [0049] and the FIG. 2 are set forth in Japanese unexamined patent publication No. 2007-94885, the disclosure of which is incorporated herein by reference.

Figure 3:
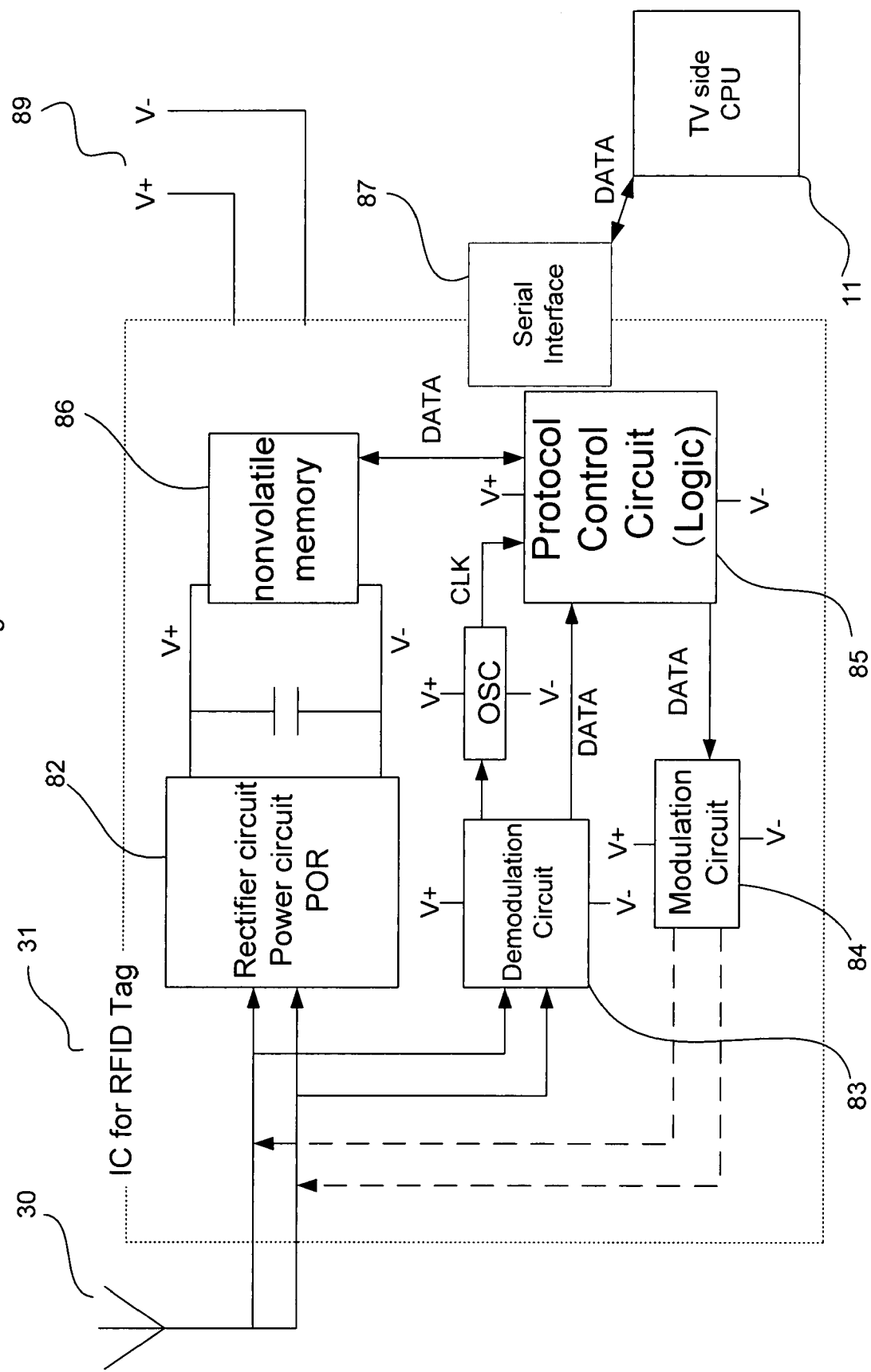
FIG. 3 shows a configuration of a semiconductor chip embedded in a wireless tag according to the present invention.

FIG. 3 shows a configuration of a semiconductor chip embedded in a wireless tag according to the present invention. FIG. 3 shows an antenna coil 30, a semiconductor chip 31, a TV side CPU 11 and a TV side power circuit 89. The antenna coil 30 is connected to the semiconductor chip 31. Also, the semiconductor chip 31 is connected to the TV side CPU 11 and the TV side power circuit 89. And the semiconductor chip 31 has a rectifier circuit 82, a demodulation circuit 83, a modulation circuit 84, a protocol control circuit 85, a nonvolatile memory 86 and an interface 87. The interface 87 may be, for example, a serial interface (12C).

First, the exchange of data between the reader and writer 20, and the semiconductor chip 31 is explained. First, modulation data is transmitted from the reader and writer 20 to the antenna coil 30. The modulated data is transmitted to the semiconductor chip 31 through the antenna coil 30. The modulated data is transmitted to the control circuit 85 after being demodulated by the demodulation circuit 83. The control circuit 85 is a circuit which decodes the received data and executes reading and writing of the data. The control circuit 85 stores the received demodulated data on the nonvolatile memory 86.

When the reader and writer 20 requests the control circuit 85 to respond, the control circuit 85 transmits the data to the modulation circuit 84, and the modulated data is transmitted to the reader and writer 20 through the antenna coil 30. At this time, the control circuit 85 may execute data encryption (conversion into a predetermined format). Exchange of the data between the reader and writer 20 and the semiconductor chip 31 may be performed when both are in a contact state or in a non-contact state. In addition, the rectifier circuit 82 has a role of rectifying the induced electromotive force induced by the antenna coil 30.

Next, the exchange of data between the television receiver 100 and the semiconductor chip 31 is explained. First, when the power for the television receiver is turned on, power voltage is supplied to the semiconductor chip 31 from the TV side power circuit 89. Thereby the control circuit 85 and the nonvolatile memory 86 are in an active state. And the TV side CPU 11 requests the control circuit 85 to read the data stored in the nonvolatile memory 86 through the interface 87. The control circuit 85 reads the requested data from the nonvolatile memory 86, and transmits the data to the TV side CPU 11. The TV side CPU 11 determines as to whether the television receiver is purchased legitimately or not by using the data. The exchange of the data between the television receiver 100 and the semiconductor chip 31 may be performed when both are in a contact state or in a non-contact state.

Figure 4:
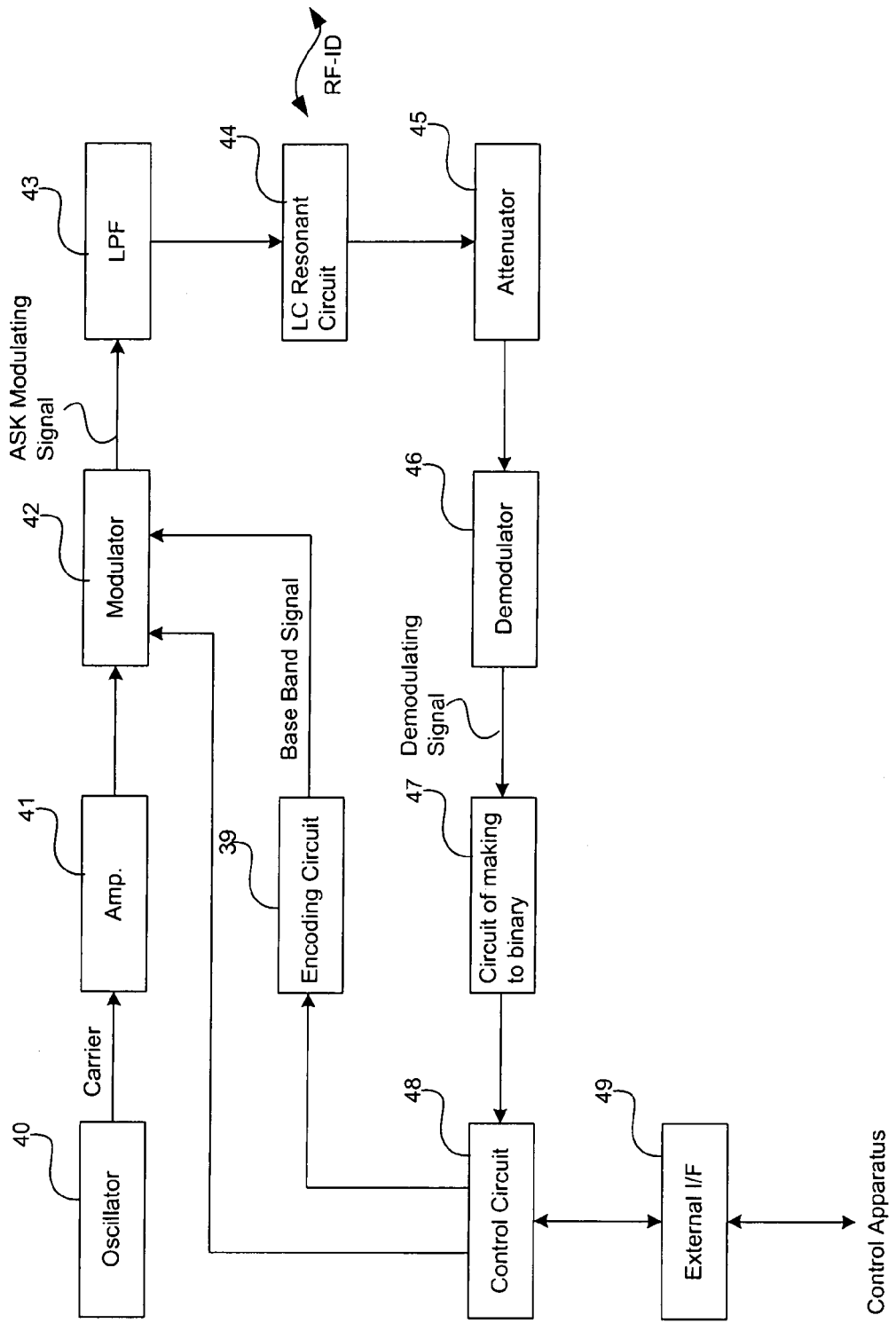
FIG. 4 shows a configuration of a wireless tag reader and writer according to the present invention.

FIG. 4 shows a configuration of a wireless tag reader and writer according to the present invention. A wireless tag reader and writer 20 is provided with a oscillation circuit 40, an amplifier circuit 41, a modulation circuit 42, a LPF (Low Pass Filter) 43, a LC resonance circuit 44, an attenuator 45, a demodulation circuit 46, a binarization circuit 47, a control circuit 48, an external interface 49 and an encoding circuit 39.

The oscillation circuit 40 is a RF generating circuit for generating a RF signal using a crystal oscillator. For example, the RF signal of 13.56 MHz is generated and output as a carrier wave. This carrier wave is power amplified by the amplifier circuit 41 and output to the modulation circuit 42.

The modulation circuit 42 performs an ASK (Amplitude Shift Keying) modulation on the power amplified carrier wave based on the base band signal from the encoding circuit 39, and performs a process to generate an ASK amplification signal. The encoding circuit 39 encodes the data input from the control circuit 48 by a pulse position, and performs a process to generate the base band signal.

High-frequency components are removed from the ASK modulation signal by the LPF 43, and then output to the LC resonance circuit 44. The LC resonance circuit 44 is a resonance circuit consisting of an antenna coil and a condenser. The ASK modulation signal from the modulation circuit 42 is transmitted to the wireless tag 16 through the LC resonance circuit 44. Also, the response signal from the wireless tag 16 is received by the LC resonance circuit 44. In this way, the LC resonance circuit 44 consists of a communication portion. The receiving signal is attenuated by the attenuator 45 described later up to a level where the demodulation circuit 46 is capable of control.

The demodulation circuit 46 demodulates the attenuated receiving signal according to the carrier wave and sub carrier wave, and generates a demodulation signal. The binarization circuit 47 is a comparator that binarizes the demodulation signal from the demodulation circuit 46, and composite receiving data is generated.

The control circuit 48 starts communication to the wireless tag 16 according to a trigger signal input from the control device 50 through the external interface 49, and also performs a control to switch the modulation degree according to the demodulation signal. Specifically, a response request to the wireless tag 16 according to a read command or a write command from the control device 50 is generated and output to the encoding circuit 39, as well as an operation to identify the reception of the response signal from the wireless tag 16 according to the demodulation signal and to switch the modulation degree of the ASK modulation signal.

At this time, an operation to automatically configure a parameter relating to the communication with the wireless tag 16 is performed according to the control signal input from the control device 50. Specifically, read a parameter table according to the automatic identification command from the control device 50, generate a reception command according to the read parameter table, and transmit to the wireless tag 16. A communication parameter is configured according to the response from the wireless tag 16 by this reception command.

On the contrary, the wireless tag reader and writer 20 communicates with the wireless tag 16 by a noncontact communication, and consists of a head for reading and writing, and a controller portion to control the head. The wireless tag reader and writer 20 is a transmitting device which demodulates and transmits the carrier wave as a base band signal by a digital signal, and receives the response signal from the wireless tag. The modulation of the carrier wave according to the base band signal is not limited specifically, and for example, the ASK (Amplitude Shift Keying) modulation to change the amplitude of the carrier wave, FSK (Frequency Shift Keying) modulation to change frequency, and the PSK (Phase Shift Keying) modulation to change phase can be considered.

The control device 50 instructs the reader and writer 20 to start communication with the wireless tag 16. And the control device 50 collects and accumulates, or displays the data read from the wireless tag 16 by the reader and writer 20. The control device 50 instructs to start communicating at a time when the reader and writer 20 is arranged at a predetermined position on the surface of a package of the television receiver and positioned in a communication area. Such a control device 50 is not limited specifically, and for example, a PLC (Programmable Logic Controller), or an information processing terminal, such as a general purpose personal computer, may be used.

Specifically, the read command or the write command is output from the control device 50 to the reader or the writer 20 as the trigger signal to instruct for starting communication. Then, the reader or the writer 20 start transmitting the response request to the wireless tag 16 according to this read command or the write command. This response request is transmitted as a ASK modulated RF signal, and repeatedly transmitted until the response signal from the wireless tag 16 is received. In addition, the details of the paragraphs [0054] to [0063] and the FIG. 4 are set forth in Japanese unexamined patent publication No. 2007-94885, the disclosure of which is incorporated herein by reference.

The timing of the operation described in FIGS. 2 to 4 is not limited specifically. For example, the writer 20 goes through the antenna coil 30 at the time of sale of the electronic device, and the control circuit 85 writes the information enabling the electronic device to operate on the nonvolatile memory 86. And, after purchasing, the TV side CPU 11 determines if the electronic device is operable or not according to the information written on the nonvolatile memory 86 through the interface 87. Also, the place where the control circuit 85 writes the information on the nonvolatile memory 86 through the antenna coil 30 may be any place. For example, it may be at a register or the exit of a store.

Figure 5:
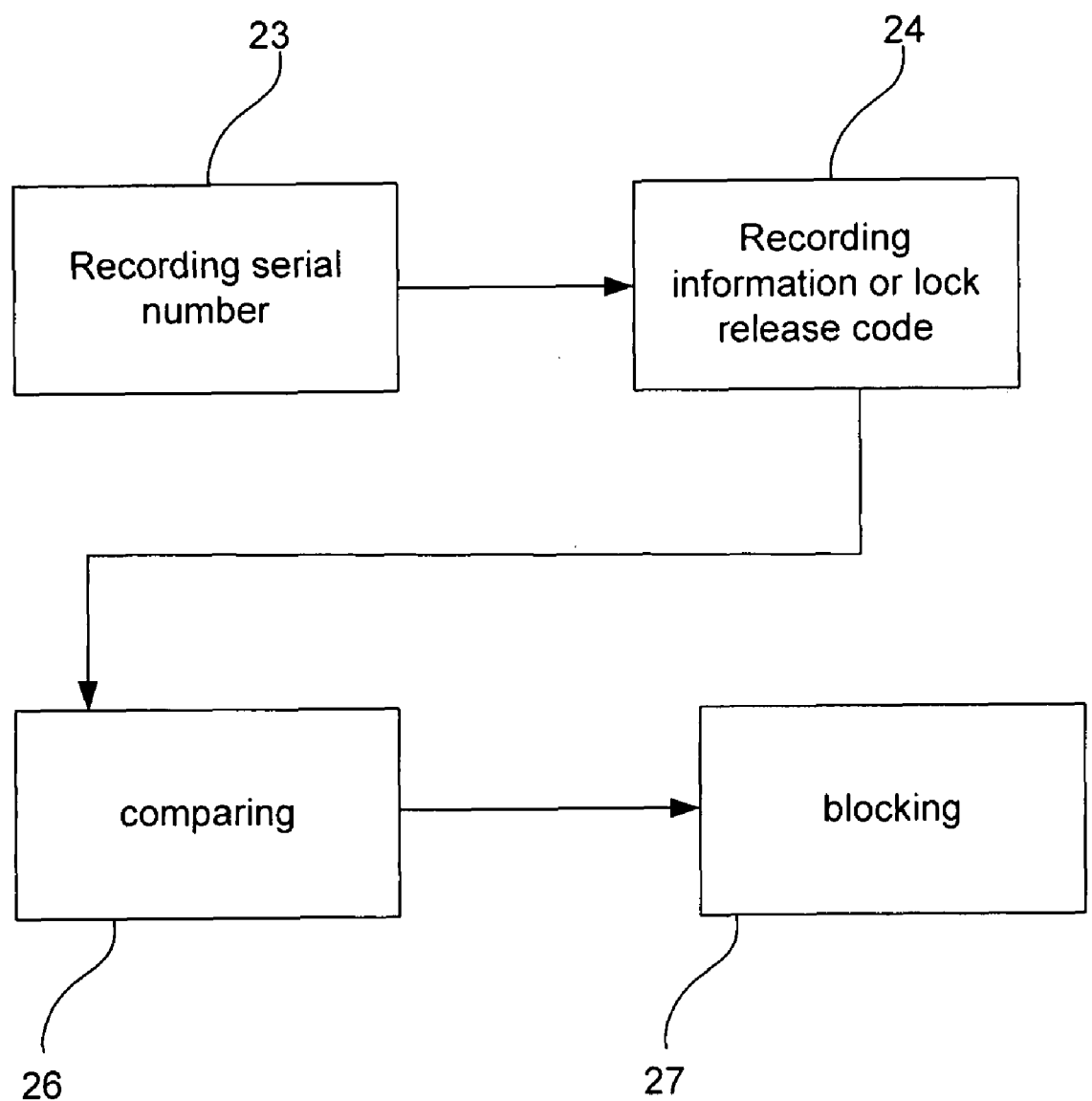
FIG. 5 shows a procedure for blocking an image in case an electronic device is stolen.

FIG. 5 shows a procedure for blocking an image in case an electronic device is stolen. First, provide predetermined information to an electronic device at a manufacturing process of the electronic device (step 23). The predetermined information may be in any form. For example, it may be a serial number, a plurality of digits of randomly selected numbers, or special characters. The serial number or the plurality of digits of randomly selected numbers may be in any digit, and it may be five or seven digits.

Also, the method for granting the predetermined information may be in any form. For example, it may be stored in a memory provided to the electronic device. The memory may be, for example, a memory of the wireless tag. Also, it may be printed on a piece of paper or tape, and attached onto the exterior of the electronic device or in the packaging of the electronic device. Further, it may be printed on a receipt at the time of purchase of the electronic device. In such case, it may be printed on a separate sheet of paper instead of the receipt. Also, the printing may be made by a barcode to describe the number. Also, a code other than the barcode, for example a two-dimensional code, may be used.

Also, the timing for providing the predetermined information is not limited to the manufacturing process of the electronic device, it may be at any time. For example, it may be at the time when the electronic device is supplied to a third party (such as stores). Also, it may be provided within the third party (such as within stores).

Next, the electronic device is supplied to a store and so on, and the information enabling the electronic device to operate (hereinafter also referred as a lock release code) is provided to the electronic device (step 24). The code may be in any form. For example, it may be a plurality of digits of randomly selected numbers, special characters, or integer, such as 1 or 0. Also, for example, it may be a code corresponding to the serial number. For example, the number that is a reverse sequence of the serial number, a number that staggers the serial number by one digit, a number created by the serial number with a random number, or a serial number of a LCD panel or a mother board.

The method for granting the code may be in any form, as long as it is a method that reads the special information, converts it into the code, and stores it on the electronic device. For example, the wireless tag reader and the wireless tag writer may be used. When the wireless tag reader and the wireless tag writer are used, the code may be written on the wireless tag again by using the wireless tag writer after reading the special information contained in the wireless tag provided to the electronic device by the wireless tag reader and applying a predetermined process to the information.

The timing for granting the code to the electronic device may be at any time. For example, it may be at the time of sale of the electronic device. Also, the place for granting the code to the electronic device may be anywhere. For example, it may be at a register, or the exit of a store.

Also, for example, a piece of paper with the special information may be handed to a purchaser. And a device, such as the wireless tag writer to provide the code, is installed inside or outside of the store, and it may be used only by the purchasers. The piece of paper to be handed to the purchaser may be in any form, and it may be a receipt.

Next, a determination is made as to whether the electronic device is operable or not according to the code provided to the electronic device (step 26). The method for the determination may be in any form. For example, the predetermined information is stored in the electronic device, the information is compared with the code, and the electronic device is determined to be operable when they are matching.

And, the electronic device is determined to be operable according to the code, the lock of the electronic device is released, and the electronic device can be used. On the other hand, when the electronic device is determined to be inoperable according to the code, the use of the electronic device is blocked (step 27).

The method for blocking the use of the electronic device may be in any form. For example, the power of the electronic device may be turned off. Also, the input provided to the electronic device may be disabled. Also, in a case where the electronic device is a television receiver, for example, it may be in a state that does not display the television signal (noise state). Also, for example, the image may be stopped after a few seconds. Further, for example, a monochrome image may be displayed on the display of the television receiver. For example, a X mark may be displayed on the display screen. Or, contact information of a third party may be displayed on the display screen.

Also, for example, when a decoder to generate video data and audio data by decoding a television signal received from a tuner is provided, the output of video data from the decoder may be stopped. Also, an image display on the television receiver may be blocked by blocking any connection indicated in FIG. 1. Also, the operation performed after the block described above may be combined. For example, requesting a user to input a predetermined password after blocking the usage, then it may be in a state that the television signal is not displayed appropriately. Also, when the television receiver is connected to an external device though a cable and the television receiver receives the video signal and the audio signal from the external device, the reception of the video signal and the audio signal from the external device may be stopped. In addition, the reception of the video signal and the audio signal from the external device may be stopped in an electronic device except the television receiver.

When the electronic device has a reset circuit to set to an initial state, the code enabling operation of the electronic device is determined to be operable. In such a case, the electronic device may be operated without having a user to release the lock of the electronic device again by using the wireless tag writer and so on even if the electronic device is reset to the initial state.

A display to request a user to input the lock release code may be made when the use of the electronic device is blocked. The electric device may be operable when an input lock release code is determined to match the code contained in the electric device. The lock release code may be in any form. For example, it may be a serial number, a plurality of digits of randomly selected numbers, special characters, or a picture. The serial number or the plurality of digits of randomly selected numbers may be in any digit, and it may be five or seven digits.

The determination as to whether the lock release code and the code contained in the electronic device matches or not may be made based on any standard. For example, both codes may be determined to be matching when both codes are completely matched. Also, for example, in a case where the code is a symbol and a user draws the symbol on the display screen of the electronic device, these may be determined to be matching not only when both are completely matched but also when there is a small difference.

The lock release code may be provided to a user in any form. For example, the lock release code may be written on a receipt which is issued at the time of purchase of the electronic device. Also, the lock release code may be available to a user by accessing a manufacturer's web site. And, a data retention company which manages the lock release code, exists on the Internet, and the code may be obtained from there. Instead of the Internet, such communication may be made though the mail. Also, in case a user lost the lock release code, the code may be obtained again. The operation to request a user to input the predetermined lock release code may be made any number of times. However, the operation is preferably twice or three times.

Figure 6:
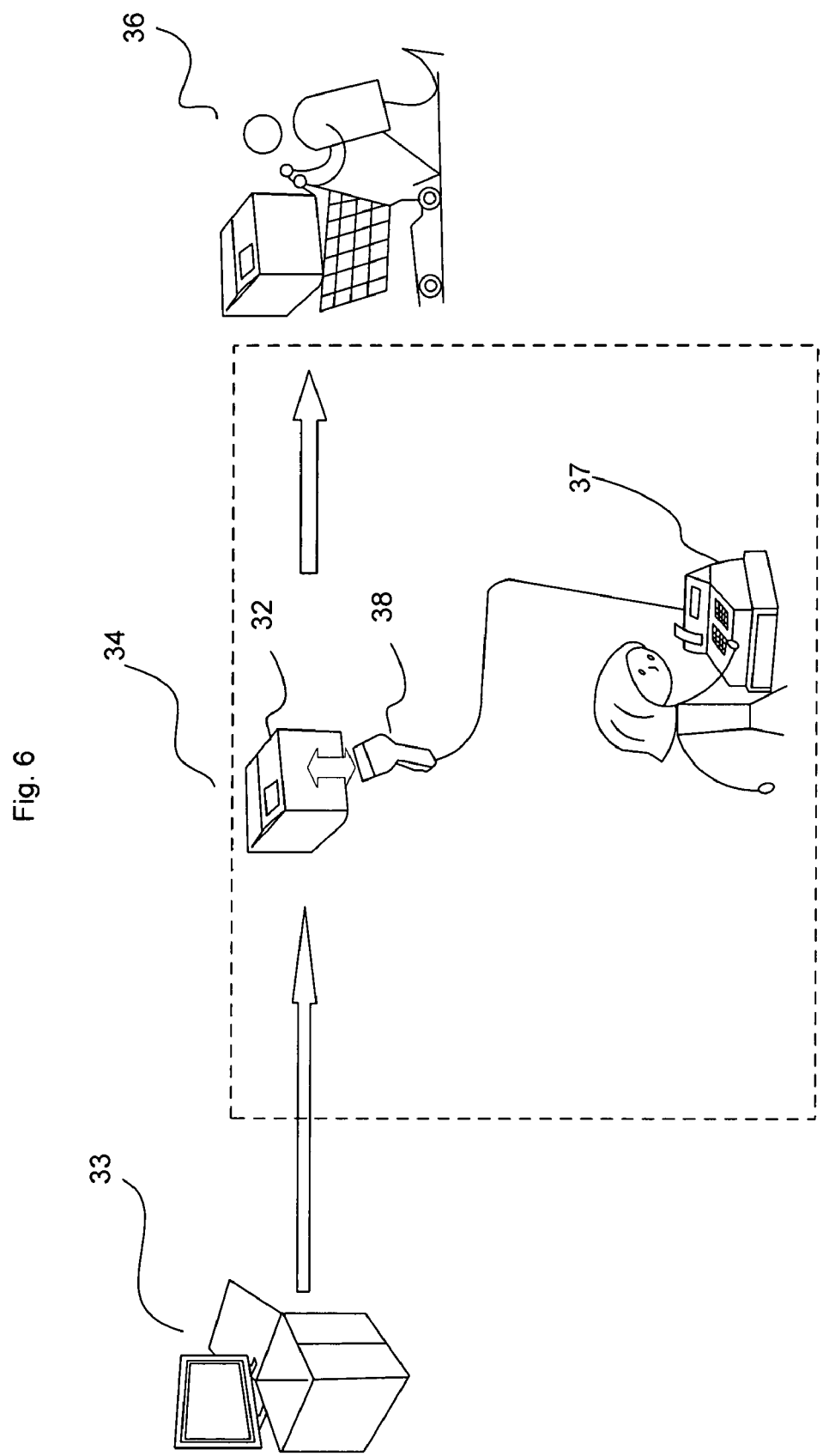
FIG. 6 shows an example of a sales process of an electronic device according to the present invention.

FIG. 6 shows an example of a sales process of an electronic device according to the present invention. In a manufacturing process 33, the predetermined information is granted to an electronic device by the method described above. And the electronic device 32 is sent to a store 34. A register 37 in the store is provided with a wireless tag reader and writer 38. When the electronic device is carried to the register, the predetermined information is converted into the code by the wireless tag reader and writer 38, and the code is granted to the electronic device. And the purchaser can use the electronic device (process 36).

In addition, the sales process is not limited that of FIG. 6, it may be the same as that explained in FIG. 5. For example, the position and the method for providing the predetermined information to the electronic device, and the method, the place or the timing for providing the code to the electronic device are not specifically limited. Also, the code may be common to a plurality of electronic devices, or it may not be common. When the code is common, the plurality of the electronic devices may be divided into groups and a code common for each group may be granted. The grouping may be done in any way. For example, grouping may be made by the year of manufacture of the electronic devices, by the quarter of manufacturing of the electronic devices, or by a plurality of electronic devices with serial numbers within a certain range, and a common code may be granted by each group. When the code is not common, for example, the code corresponding each serial number may be granted.

Figure 7:
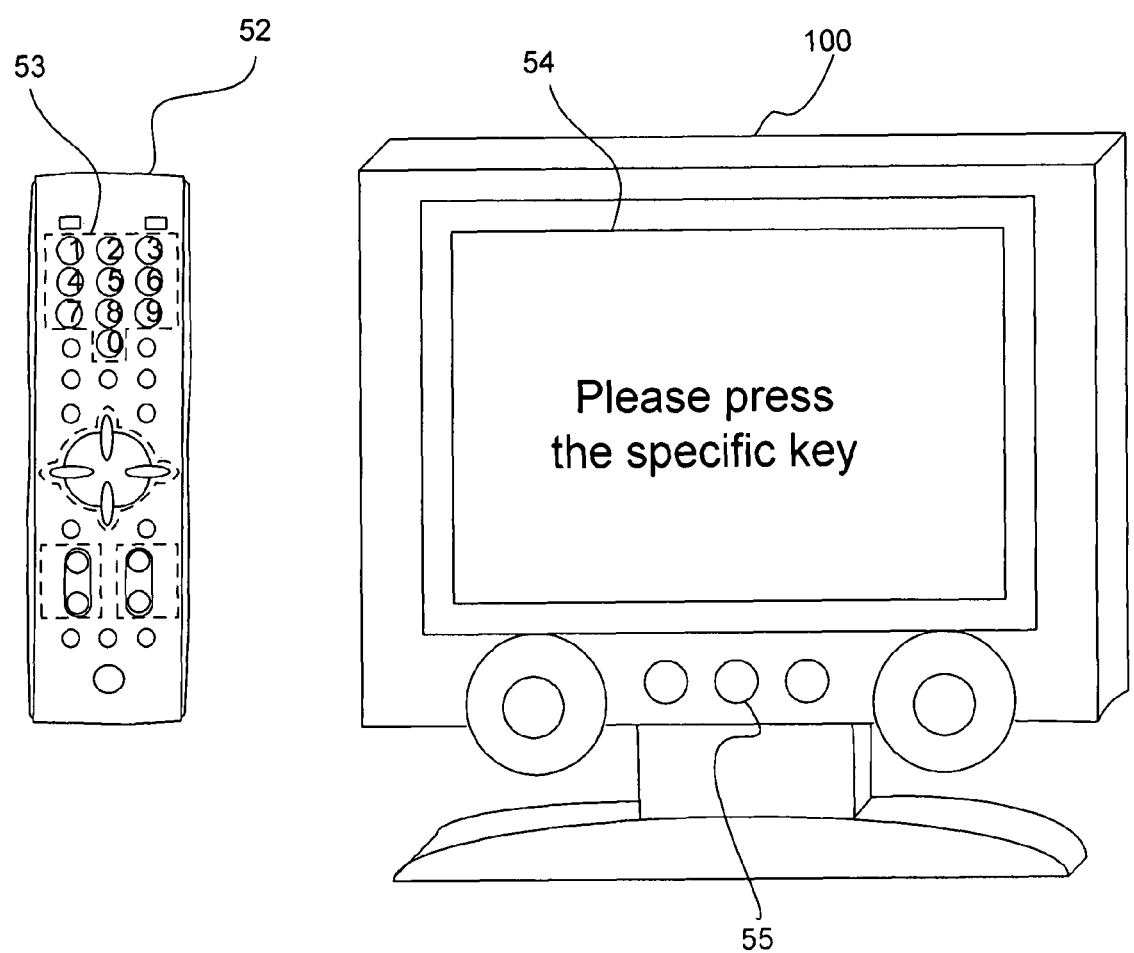
FIG. 7 shows an example of a television receiver according to the present invention.

FIG. 7 is an example of a television receiver according to the present invention. The FIG. 7 shows a television receiver 100 and an input device 52. The input device 52 is provided with a plurality of inputs 53. The television receiver 100 has a display screen 54 and a plurality of inputs 55. The display screen 54 is displaying "Please press the specific key".

A user performs some sort of operation to the television receiver according to the instruction of the display screen. And, the television receiver can be used when a correct lock release code is written on the television receiver. On the other hand, the television receiver can not be used when the lock release code is not written, or when the user did not input the correct lock release code. The plurality of inputs 53 and 55 may include an input to correct an input, an input to return the television receiver to an initial state, or a confirmation key to confirm a predetermined item.

Figure 8:
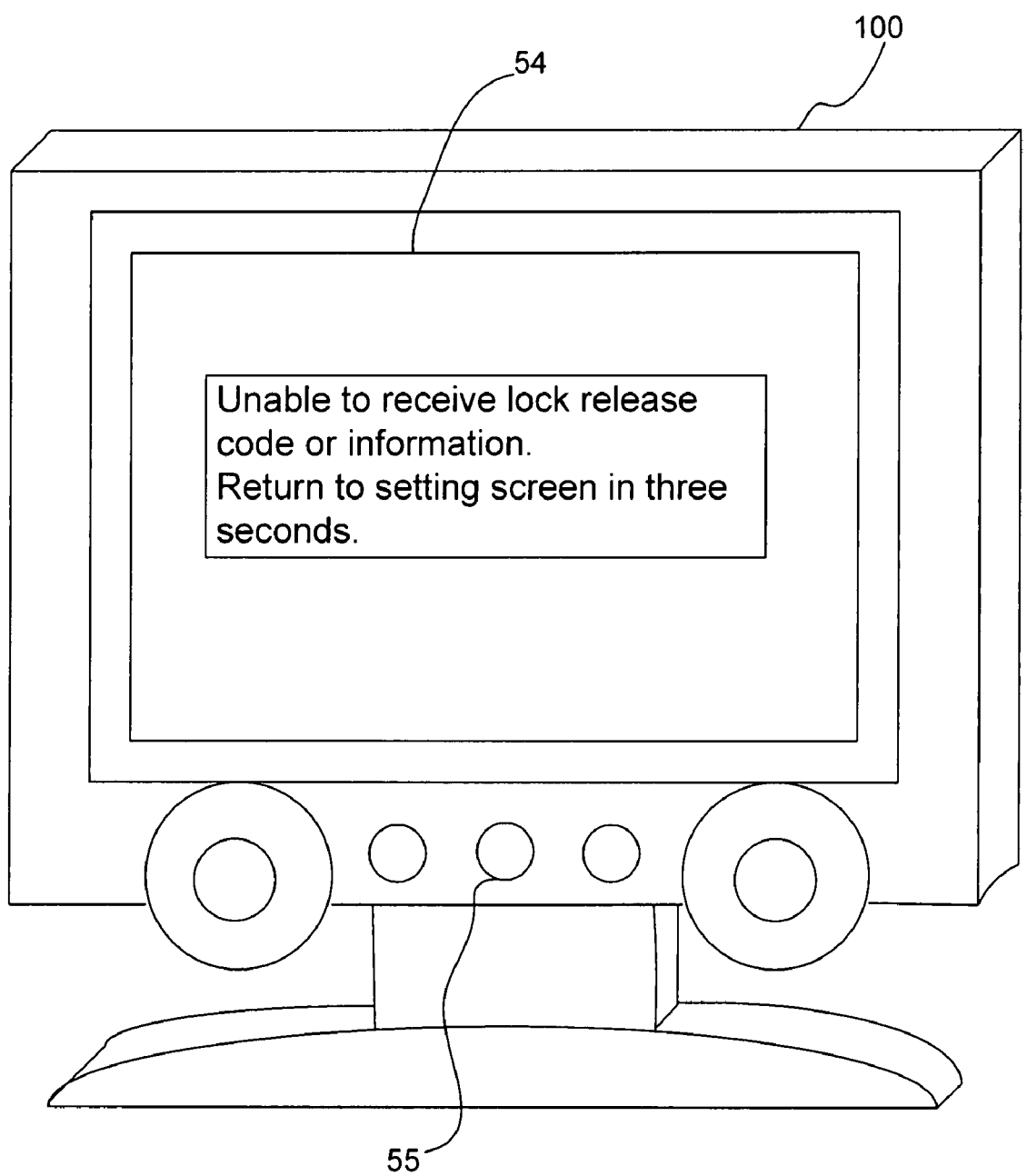
FIG. 8 shows another example of a television receiver according to the present invention.

FIG. 8 is another example of a television receiver according to the present invention. The television receiver 100 has a display screen 54 and a plurality of inputs 55. The display screen 54 is displaying "Unable to receive specific code. Return to setting screen in three seconds." That is, the correct lock release code is not written on the television receiver, therefore, an image is not displayed.

As explained in FIG. 5 above, the television receiver according to the present invention is not limited to those explained in FIGS. 7 and 8. For example, the display screen to provide a user with information may be displayed in any form. Also, the method for blocking the image display may be in any form.

Figure 9:
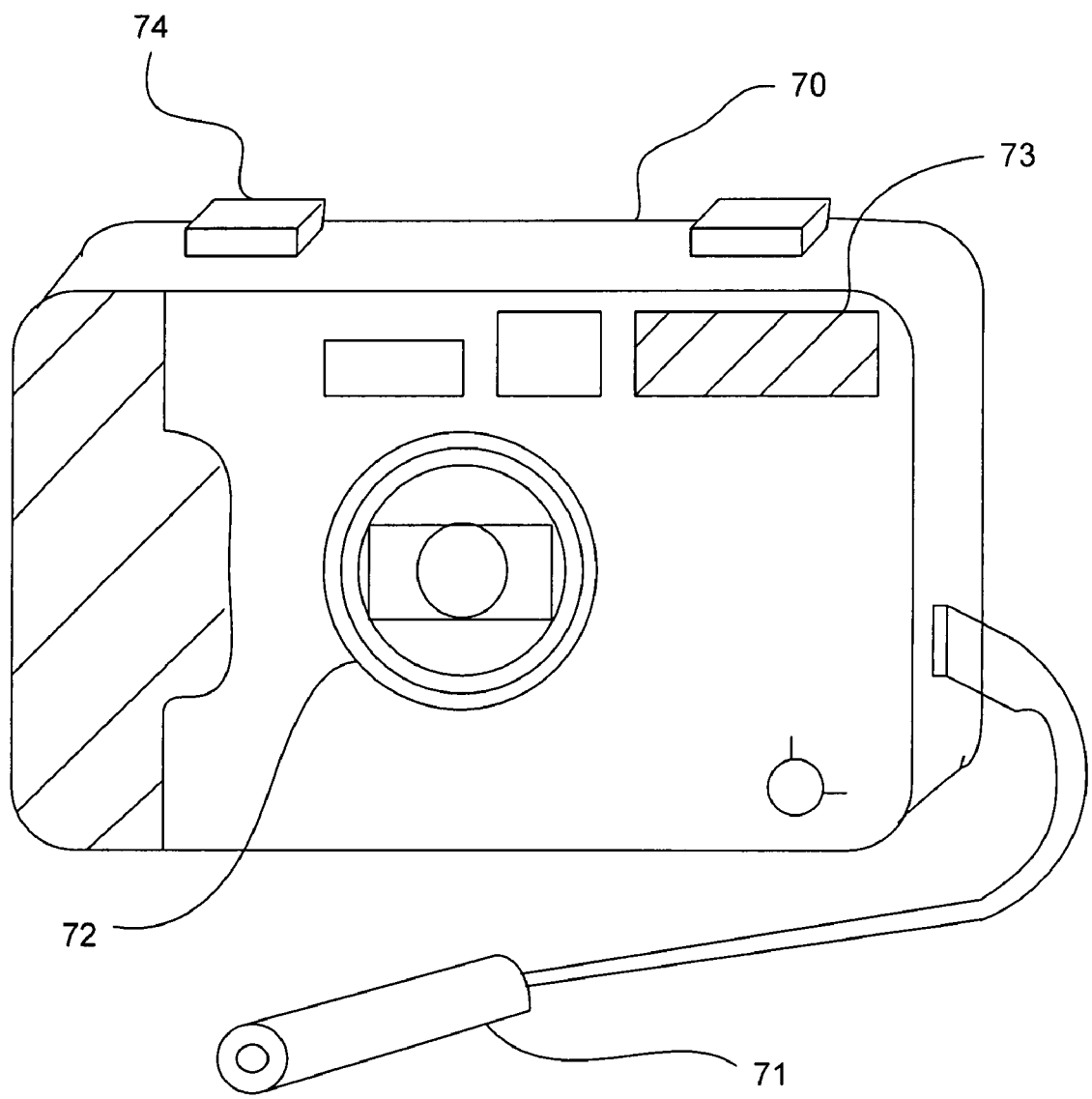
FIG. 9 shows an example of a digital camera with a CCD according to the present invention.

FIG. 9 shows a digital camera with a CCD according to the present invention. A digital camera 70 is provided with a CCD camera 71, a lens 72 to take a picture, a flash button 73 to brighten the subject, and a button 74 to input the timing of the photograph. The digital camera according to the present invention also has the features explained in FIGS. 1 to 8. For example, when a user inputs a lock release code, the digital camera may be enabled by reading the code printed on a receipt with the CCD camera 71 to import into the digital camera.

Also, the digital camera may be provided with inputs and the user may input the code using those inputs. Further, when the lens 72 photographs the information code, the image is processed in the digital camera, and the code may be imported into the digital camera. When the imported code does not match the lock release code stored in the memory of the digital camera, use is blocked. The method for blocking may be similar to those explained in FIG. 5 above, or it may be in any form. For example, the shutter to protect the lens 72 does not open and scenery can not be viewed from the lens 72.

Figure 10:
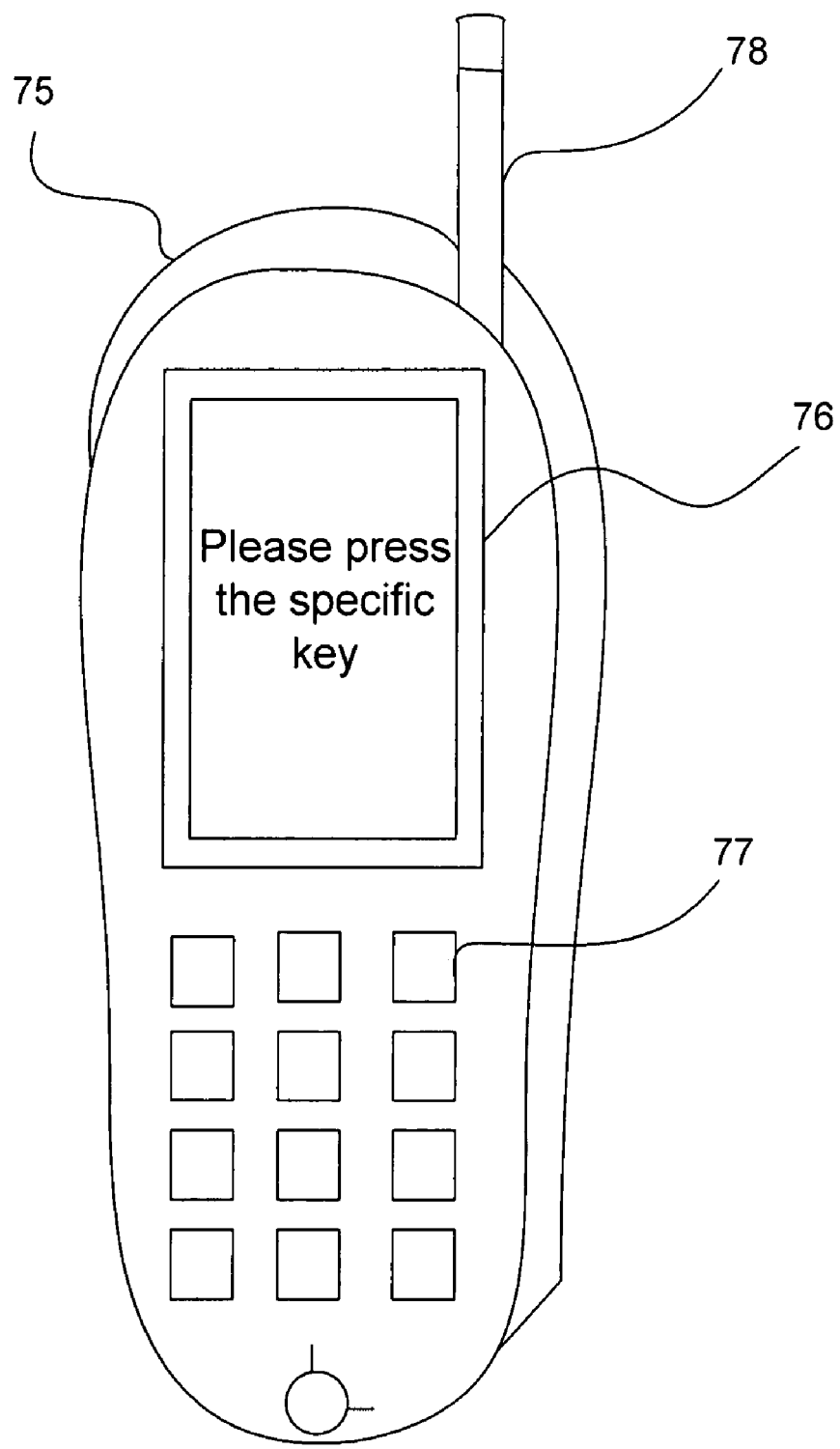
FIG. 10 shows an example of a cellular phone according to the present invention.

FIG. 10 shows an example of a cellular phone according to the present invention. A cellular phone 75 is provided with a display screen 76, a plurality of input buttons 77, and a signal reception antenna 78. The cellular phone according to the present invention has features explained in FIGS. 1 to 8. Also, for example, when a user obtains a lock release code, the code may be obtained by accessing the web site of the manufacturer or store using the cellular phone and obtaining the code by Bluetooth. Also, the code may be obtained by inserting an USB flash memory containing software into the cellular phone. The method for disabling the cellular phone may be similar to those explained in FIG. 5, or it may be any form. For example, the antenna of the cellular phone may be disabled to receive the signal.

Figure 11:
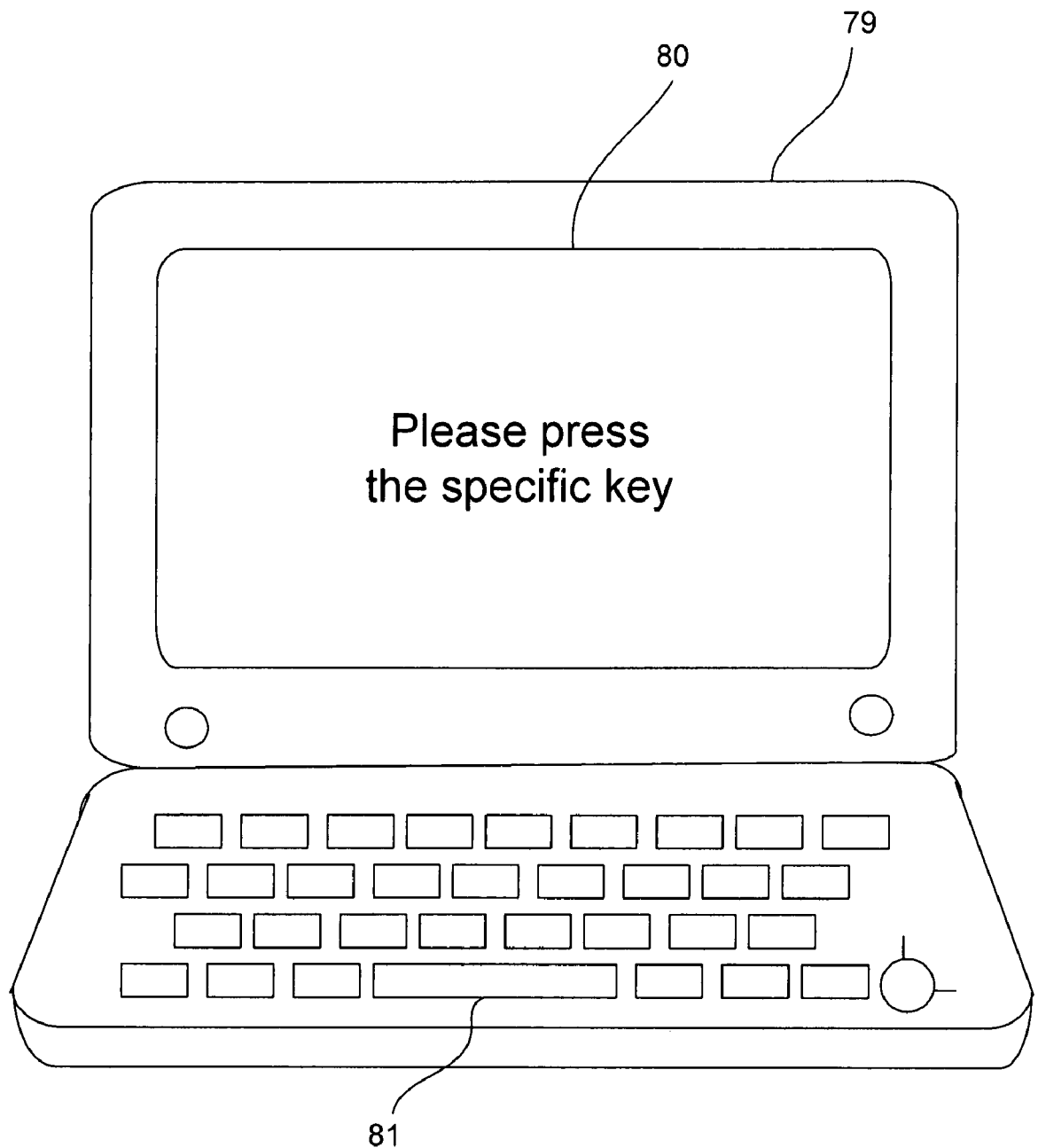
FIG. 11 shows an example of a personal computer according to the present invention.

FIG. 11 shows an example of a personal computer according to the present invention. A personal computer 79 is provided with a display screen 80, and a plurality of input buttons 81. The personal computer according to the present invention has features explained in FIGS. 1 to 8. The method for disabling the personal computer may be similar to those explained in FIG. 5, or it may be any form.

Figure 12:
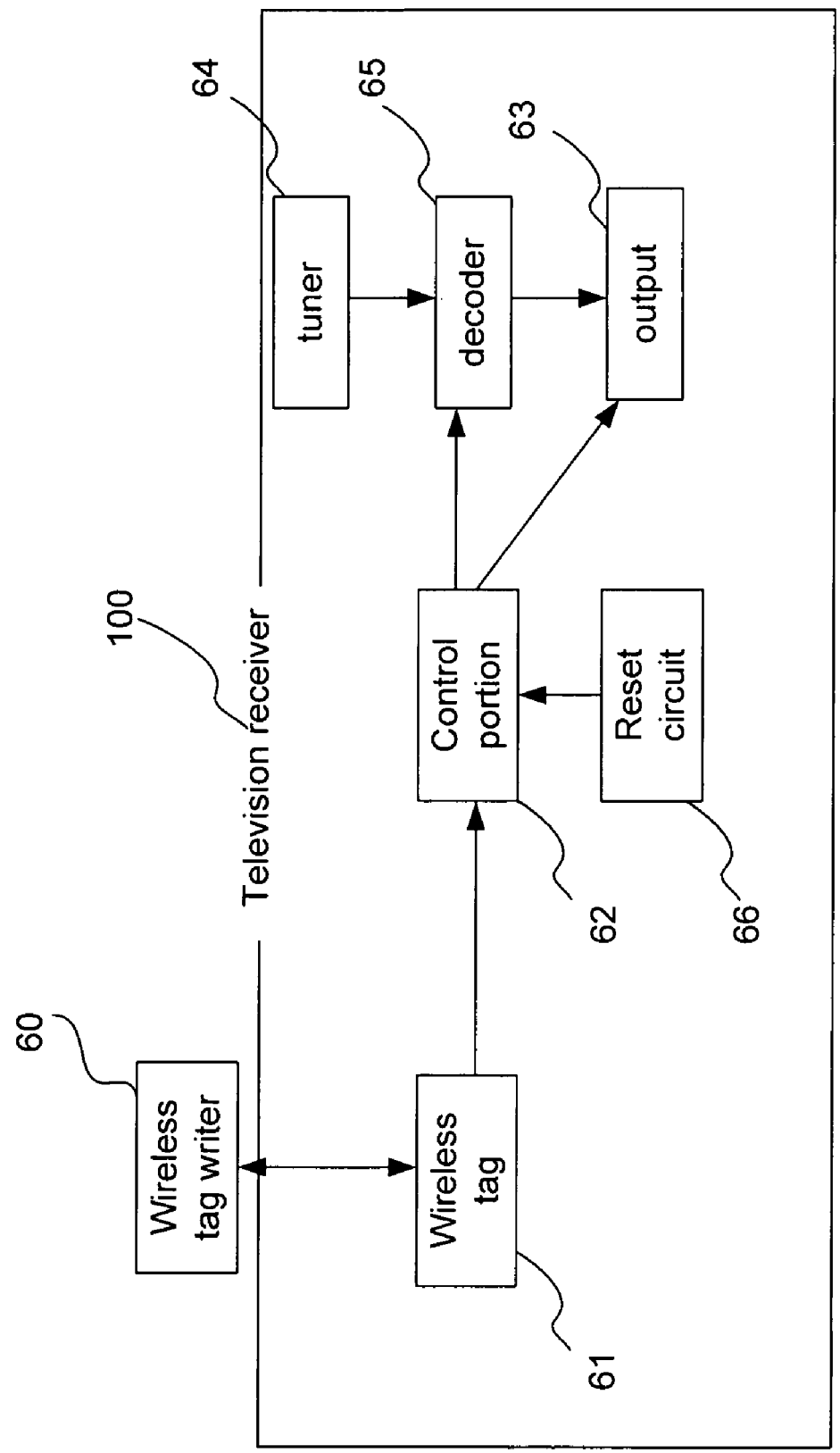
FIG. 12 shows a system that operates a television receiver according to the present invention.

FIG. 12 shows a system of operating a television receiver according to the present invention. The system has a television receiver 100, a wireless tag reader and writer 60. The television receiver 100 has a wireless tag 61, a control portion 62, an output portion 63, a tuner 64, a decoder 65, and a reset circuit 66. The wireless tag 61 stores the predetermined information.

First, the predetermined information stored in the wireless tag 61 is read by the wireless tag reader 60. The predetermined information is converted into a lock release code. The code is transmitted to the wireless tag 61 by the wireless tag writer 60. The wireless tag 61 receives the code then transmits the code to the control portion 62. The control portion 62 determines as to whether the television receiver is to be enabled or not according to the code. The determination is made by the method similar to those explained in FIG. 5 above.

When the control portion 62 determines the television receiver is operable, an instruction is transmitted from the control portion 62 to the output portion 63, and the output portion 63 starts the image display and the audio output. On the other hand, when the control portion 62 determines the television receiver is inoperable the control portion 62 does not instruct the output portion for image display or audio output. Alternatively, the control portion 62 transmits an instruction not to display an image or output sound to the output portion 63. In such case, the control portion 62 may transmit an instruction to display a screen to input the lock release code to the output portion 63.

The television signal is transmitted from the tuner 64 to the decoder 65, decoded at the decoder 65, and converted into image data and audio data. The data is output from the output portion 63. When the control portion 62 determines the television receiver is inoperable, the control portion 62 accesses the decoder 65 and it also is able to stop the output of the data. As a result, the television receiver does not display an image or output sound.

An instruction to set the television receiver to an initial state is transmit from the reset circuit 66 to the control portion 62, and then the television receiver may return to the initial state. In such case, the control portion 62 may output the signal enabling the television receiver to operate from the output portion 63 without receiving the instruction enabling the television receiver to operate by the control portion 62 when the control portion 62 determines that the television receiver is operable at least once. In addition, in the system described above, the television receiver 100 and the tuner 64 may be separated or integrated.

Figure 13:
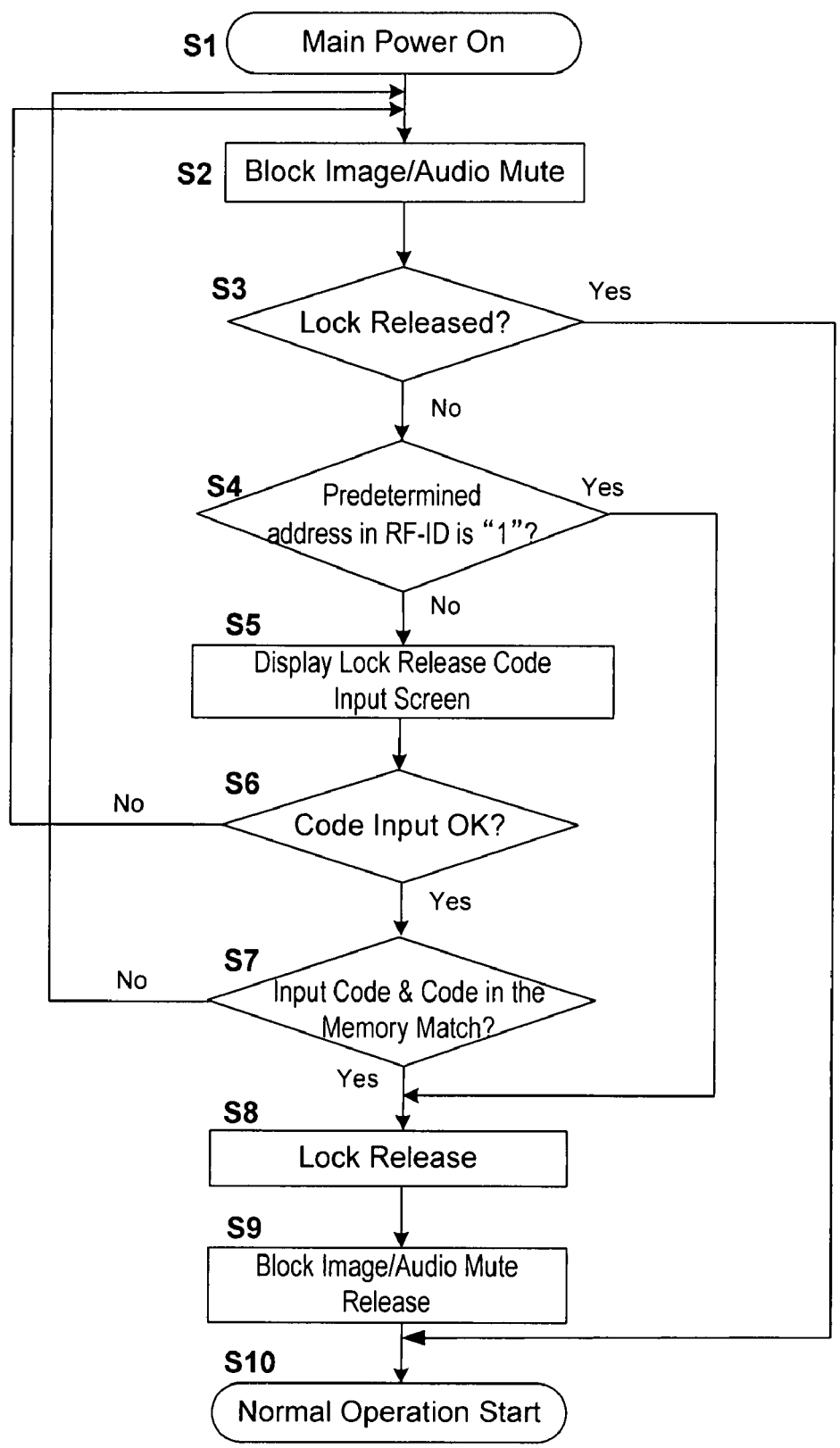
FIG. 13 shows an example of a flowchart of operation of an electronic device according to the present invention.

FIG. 13 shows an example of a flowchart of an operation of an electronic device according to the present invention. When the power of the television receiver is turned on, the television receiver starts up (S1). Then the television receiver blocks an image and the audio is muted (S2). Next, the television receiver determines whether the use lock is released or not (S3). When the lock is determined to be released, the image display and audio output are started (S10). On the other hand, when the lock is determined to not be released, a determination is made as to whether the lock release code (in this case "1") is written on the wireless tag provided to the television receiver (S4).

When "1" is written on the wireless tag, the television receiver releases the lock (S8). Then, the image display and the sound output are started (S9), and the normal operation is performed (S10). On the other hand, when "1" is not written on the wireless tag, the television receiver requests a user to input the lock release code (S5). And the television receiver determines if there is an input of the lock release code (S6). When there is no input of the lock release code, the television receiver blocks an image and mutes sound (S2). On the other hand, when there is the input of the lock release code, the code is determined if it is correct or not (S7).

When the code is determined to be not correct, the television receiver blocks the image and mutes the sound (S2). On the other hand, when the code is determined to be correct, the television receiver releases the lock (S8). Then, the image display and audio output are started (S9), and the normal operation is performed (S10).

Figure 14:
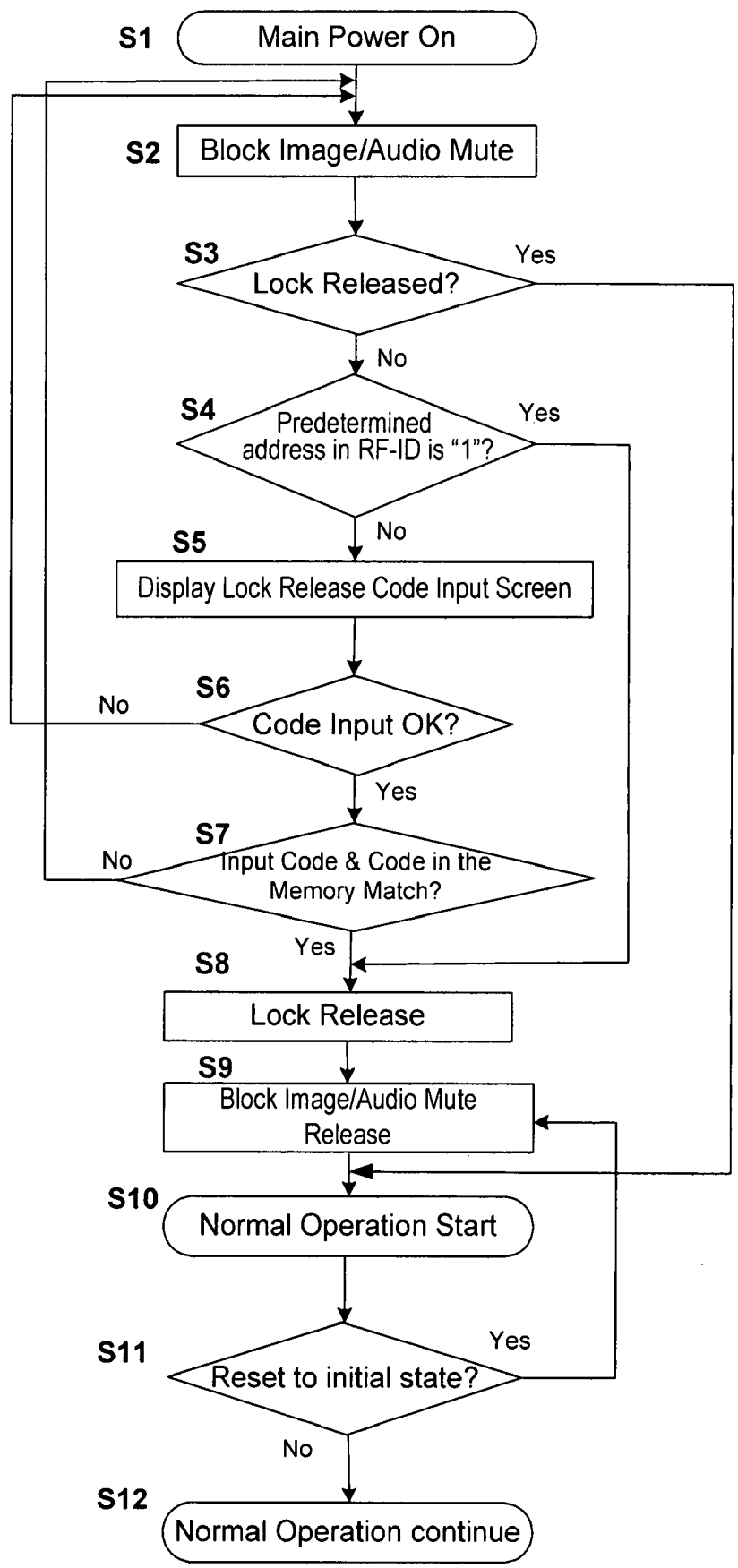
FIG. 14 shows another example of a flowchart of operation of an electronic device according to the present invention.

FIG. 14 is another example of a flowchart for an operation of an electronic device according to the present invention. From steps S1 to S10, the television receiver operates as explained in FIG. 13. After the television receiver starts normal operation (S10), a determination is made as to whether there is an instruction to return the television receiver to an initial state or not (S11).

When it is determined there is no instruction to reset to the initial state, the image display and the audio output are continued (S9). When it is determined there is an instruction to reset to an initial state, all the functions of the television receiver, except for releasing the lock of the image and the audio, are reset to the initial state (S12). That is, once the lock is released for the images and the audio, they are not locked again even when the television receiver is reset to the initial state.

In addition, the operation of the electronic device according to the present invention is not limited to those explained in FIGS. 13 and 14, it may be the same as that explained in FIG. 5, or it may be in any form. For example, the code written on the wireless tag and the code input by the user may be any form. For example, the television receiver may be configured so as to release the lock when "1" is written on the wireless tag, and not to release the lock when "0" is written on the wireless tag. Further, the lock release code that is requested to be input by a user, and the lock release code written on the wireless tag to enable the television receiver may be the same, or different. Also, for example, the input operation of the lock release code by the user may be performed any number of times. Also, the electronic device may be disabled without giving a user an opportunity to input the security code, or it may display a screen on contact information for the manufacturer.

The present invention is not limited to the embodiments above. For example, only a part of an electronic device including a television receiver is explained in the FIGS. 1 to 14, however, the contents explained in FIGS. 1 to 14 may be applied to all electronic devices. For example, VCRs, DVD players, camcorders, vacuum cleaners, electric heaters, air conditioners, rice cookers, digital cameras, land-line phones, cellular phones, personal computers, or electric fans may be considered as an electronic device. Also, the electronic devices may be provided with a solar cell.

Further, the television receiver 100, the wireless tag 16, the semiconductor chip 31 and its reader and writer 20 according to the present invention are explained in FIGS. 1 to 4, however, it is not limited to the description above. For example, it may be provided with other circuits or components.

Also, for example, the electronic device may be enabled at any time. For example, it may be when the lock release code is written on the electronic device. Also, it may be enabled when the power of the electronic device is turned on or when determined according to the lock release code. Also, the electronic device may be enabled when the user performs some sort of operation to the electronic device written with the lock release code.

What is claimed is:

1. An electronic device comprising a wireless tag containing information enabling the electronic device to operate, and a control portion accessible to the wireless tag, wherein said information is written on the wireless tag by a wireless tag writer at a time of purchase of the electronic device; and
    said control portion releases a lock of the electronic device when the electronic device is determined to be operable according to the information stored in the wireless tag.

2. The electronic device according to clam 1, wherein said control portion requests to input a lock release code when the electronic device is determined to be inoperable according to the information stored in the wireless tag.

3. The electronic device according to claim 2 further comprising a decoder to generate a video data and an audio data by decoding a television signal received from a tuner,
    wherein said control portion stops an output from the decoder when the electronic device is determined to be inoperable according to the input of said lock release code.

4. The electronic device according to claim 3, wherein said electronic device is connected to an external device through a cable;
    said electronic device receives a video signal and an audio signal from said external device; and
    said control portion stops the reception of the video signal or the audio signal from the external device when the result of comparison at a comparing portion is not confirmed.

5. The electronic device according to claim 1, the electronic device further comprises a reset circuit to set to an initial state,
    wherein said electronic device still displays an image when it is reset to the initial state in case the electronic device is determined to be operable according to the information stored in the wireless tag.

6. An electronic device comprising a wireless tag containing information related to a serial number of the electronic device, and a control portion accessible to the wireless tag, wherein a lock release code according to the information related to the serial number stored in the wireless tag is further written on the wireless tag by a wireless tag writer at a time of purchase of the electronic device; and
    said control portion releases a lock of the electronic device when the electronic device is determined to be operable according to the lock release code written on the wireless tag.

7. The electronic device according to claim 6, wherein said writing of the lock release code on said wireless tag comprises reading the information related to the serial number of the electronic device stored in the wireless tag by the wireless tag reader, and writing the lock release code corresponding to the information related to the serial number of the electronic device on the wireless tag by the wireless tag reader at the time of purchase of the electronic device.

8. The electronic device according to clam 6, where said control portion requests to input the lock release code when the electronic device is determined to be inoperable according to the information stored in the wireless tag.

9. The electronic device according to claim 8 further comprising a decoder to generate a video data and an audio data by decoding a television signal received from a tuner,
    wherein said control portion stops an output from the decoder when the electronic device is determined to be inoperable according to the input of the lock release code.

10. The electronic device according to claim 9, wherein said electronic device is connected to an external device through a cable;
    said electronic device receives a video signal and an audio signal from said external device; and
    said control portion stops the reception of the video signal or the audio signal from the external device when the result of comparison at a comparing portion is not confirmed.

11. The electronic device according to claim 6, the electronic device further comprising a reset circuit to set to an initial state,
    wherein said electronic device still displays an image when it is reset to the initial state in case the electronic device is determined to be operable according to the information stored in the wireless tag.

12. A method for preventing theft of an electronic device comprising the steps of:
    writing information enabling the electronic device to operate on a memory of a wireless tag by a wireless tag writer at the time of purchase of the electronic device; and
    determining as to whether the electronic device is to be enabled or not according to the information written on the wireless tag.

13. The method for preventing theft of an electronic device according to claim 12, the method further comprising the step of:
    requesting an input of a lock release code when the electronic device is determined to be inoperable according to the information stored in said wireless tag.

14. The method for preventing theft of an electronic device according to claim 12, the method further comprising the steps of:
    writing information related to a serial number of the electronic device on said wireless tag at a time of shipping of the electronic device;
    reading the information related to the serial number of the electronic device stored in the wireless tag by a wireless tag reader at a time of purchase of the electronic device; and
    writing a lock release code corresponding to the information related to the serial number of the electronic device on said wireless tag by a wireless tag writer.

15. The method for preventing theft of an electronic device according to claim 12, the method further comprising the steps of:
- generating an image data and an audio data by decoding a television signal received from a tuner; and
- stopping an output of the image data and the audio data when the electronic device is determined to be inoperable according to the information written on said wireless tag.

16. The method for preventing theft of an electronic device according to claim 12, wherein said electronic device further comprises a function to set to an initial state, wherein said electronic device still displays an image when it is reset to the initial state in case the electronic device is determined to be operable according to the information written on the wireless tag.

* * * * *